United States Patent [19]

Kosak et al.

[11] 4,440,419
[45] Apr. 3, 1984

[54] INDIVIDUAL WHEEL SUSPENSION FOR NON-STEERED MOTOR VEHICLE WHEELS EXHIBITING A CHANGE IN CAMBER WHEN SPRUNG, ESPECIALLY ON AUTOMOBILES

[75] Inventors: Werner Kosak, Dachau; Wolfgang Matschinsky, Munich, both of Fed. Rep. of Germany

[73] Assignee: Bayerische Motoren Werke, Fed. Rep. of Germany

[21] Appl. No.: 321,607

[22] Filed: Nov. 16, 1981

[30] Foreign Application Priority Data

Nov. 14, 1980 [EPO] European Pat. Off. ........... 80107073.1
U.S. Patent 4,440,868

[51] Int. Cl.$^3$ .............................................. B62D 17/00
[52] U.S. Cl. .................................... 280/661; 280/673; 280/675; 280/690; 280/697; 280/701
[58] Field of Search ............... 280/661, 673, 675, 690, 280/697, 698, 699, 700, 701

[56] References Cited

U.S. PATENT DOCUMENTS

| | | | |
|---|---|---|---|
| 2,775,467 | 12/1956 | Kraus | 280/701 |
| 3,672,698 | 6/1972 | Froumajou | 280/697 |
| 3,759,542 | 9/1973 | Loffler | 280/697 |
| 4,269,432 | 5/1981 | Inoue | 280/690 |
| 4,345,778 | 8/1982 | Minagawa | 280/701 |

*Primary Examiner*—Bruce H. Stoner, Jr.
*Assistant Examiner*—John A. Carroll
*Attorney, Agent, or Firm*—Craig & Burns

[57] ABSTRACT

An individual wheel suspension for a non-steered wheel of a motor vehicle such as an automobile exhibiting a change in camber of the wheel during spring deflection comprises a trailing arm which is connected to the support for the wheel and articulated to the vehicle body by means of a lengthwise arm disposed in a lengthwise direction of the vehicle and in a direction running transversely to the vehicle by means of two wishbones located one above the other. The wishbones form auxiliary tie rods in a transverse plane running vertically through the center of the wheel, the extensions of the tie rods, running toward the center of the vehicle, intersecting at a transverse pole located at a distance from the wheel center plane. The individual wheel suspension is characterized in that the auxiliary tie rods have articulations to the support for the wheels and are provided in an additional distance determined relative to the transverse pole in the vicinity of the wheel center plane, in that the auxiliary tie rod of the lower wishbone is made at least approximately half as long as the additional distance and the upper wishbone forms an auxiliary tie rod whose length is less than or equal to that of the lower auxiliary tie rod, and in that the lengthwise arm is arranged pointing forward in the direction of travel of the vehicle with the articulation of the lengthwise arm to the vehicle body being located above the axle and in the vicinity of the wheel center plane.

13 Claims, 3 Drawing Figures

INDIVIDUAL WHEEL SUSPENSION FOR NON-STEERED MOTOR VEHICLE WHEELS EXHIBITING A CHANGE IN CAMBER WHEN SPRUNG, ESPECIALLY ON AUTOMOBILES

The present invention relates to an individual wheel suspension for a non-steered wheel of a motor vehicle. An automobile wheel typically exhibits a change in camber during spring deflection, wherein the suspension comprises a trailing arm which is connected to the support for the wheel and articulated to the vehicle body by means of a lengthwise arm disposed in the lengthwise direction of the vehicle and in a direction running transversely to the vehicle by means of two wishbones located one above the other. The wishbones form auxiliary tie rods in a transverse plane running vertically through the center of the wheel, the extensions of the tie rods, running on the other side of the center of the vehicle, intersecting at a transverse pole located at a distance from the wheel center plane.

An individual wheel suspension of this type is described in the journal "ATZ" 73 (1971) pages 248–250, under spherical wheel suspensions. Among the design data are the camber "$\gamma$", the desired change in camber "$\Delta\gamma$" of the wheel during spring compression, and the transverse polar distance "q", linked to the desired change in camber "$\Delta\gamma$" as follows: $q = 1/\Delta\gamma$.

From this relationship there follows for a desirably small change in camber "$\Delta\gamma$" over a spring travel "f", which is relatively large for comfort reasons, a relatively large transverse polar distance $q = f/\Delta\gamma$.

An object of the present invention is to establish a relationship between a relatively long transverse polar distance resulting from the above relationship, and the length of the auxiliary tie rods as referred to above, according to which a desired roll steer effect of the wheel of the individual wheel suspension is achieved during spring deflection.

A further object of the invention is to provide, in a wheel suspension of the aforementioned type, an arrangement of the lengthwise arm and wishbones which can be located in a small space in the vehicle and by means of which the wheel exhibits essentially a positive toe-in behavior as the springs are compressed and extended.

These and other objects of the invention are achieved by providing, in an individual wheel suspension of the aforementioned type that the auxiliary tie rods have articulations proximate to the wheel and are provided in an additional distance determined relative to the transverse pole in the vicinity of the wheel center plane, in that the auxiliary tie rod of the lower wishbone is made at least approximately half as long as the additional distance, and the upper wishbone forms an auxiliary tie rod whose length is less than or equal to that of the lower auxiliary tie rod, and in that the lengthwise arm is arranged pointing forward in the direction of travel of the vehicle with the articulation of the lengthwise arm to the vehicle body being located above the axle and in the vicinity of the wheel center plane.

The invention offers the advantage that the wheel of the individual wheel suspension exhibits a favorable toe-in behavior as the springs are compressed and extended, with a desirably small change in camber to reduce the tire load, i.e., the wheel does not toe out. On an axle with wheels suspended according to the invention, this produces an understeering to neutral steering behavior of this axle. Furthermore, with an axle of this kind, having a low center of momentum and (for small changes in camber in the wheels) relatively large transverse polar distances with the arrangement of the articulation of the lengthwise arm above the wheel axle and in the vicinity of the wheel center plane, maximum antidive compensation and high antisquat compensation are achieved. If less antisquat compensation is sufficient, the other above-mentioned advantages of the invention are fully retained, even if auxiliary tie rods of different lengths are used, with the upper auxiliary tie rod being shorter, if the articulation of the lengthwise arm is either lowered and/or the transverse pole is raised.

The lengths of the auxiliary tie rods located in the transverse plane, according to the invention as referred to above, are achieved in a simple fashion by providing wishbones whose articulations to the vehicle body are located ahead of the transverse plane in the direction of travel, whereby the arrangement of the articulation of the lengthwise arm in the vicinity of the wheel center plane operates advantageously above the wheel axle and also near the wheel profile. In this way, short wishbones are produced which advantageously required little installation space. Furthermore, this produces an individual wheel suspension which requires a small installation space, so that, in the case of a rear axle with wheels suspended in the manner of the invention, a large trunk is advantageously produced and/or a large fuel tank can be mounted ahead of the rear axle, beneath the rear seat. The lengthwise arm and wishbones of each individual wheel suspension according to the invention on an axle can be mounted directly on the vehicle body, thereby eliminating the need for a separate axle support. This also eliminates a connection between both individual wheel suspensions on the axle so that there is no steering effect exerted on one wheel when forces act unilaterally on the other. Eliminating an axle support also provides additional space for the trunk and/or fuel tank, whereby the center of gravity of the vehicle can also be lowered. In a powered axle without an axle support, an axle drive mounted on the vehicle body avoids stressing the wheel suspension by the drive torques of the axle drive.

In a disclosed embodiment of the invention, the wishbones form auxiliary tie rods of equal length, arranged symmetrically with respect to the wheel axle, the wishbones having lengths corresponding to approximately half the additional distance, whereby the articulations of the lengthwise arm to the vehicle body, looking from the rear, is disposed maximally at the level of a line parallel to the wheel axle and through the transverse pole. It follows that the instantaneous axis of the wheel suspension, running through the above-mentioned articulation and the transverse pole, runs parallel to the wheel axis in every wheel position, with the spring compressed or extended, looking forward in the direction of travel, i.e., the instantaneous axis follows the pivoting of the wheel axis at a parallel interval. This arrangement produces the limiting case of a straight line as a toe-in curve since there is no change in toe-in. This means that the above-mentioned toe-in of the wheel remains constant as the spring is compressed or extended. However, if the articulation is located below or above the above-mentioned parallels, the straight toe-in curve will slope (understeer or oversteer).

Sharply curved, positive toe-in curves are achieved using auxiliary tie rod lengths which are each greater than half the additional distance. Depending on the choice of the lengths of the upper auxiliary tie rod relative to the lower auxiliary tie rod, a toe-in curve can be produced which produces a strongly positive toe-in change as the spring on that wheel is compressed and produces a toe-in change which tends to produce toe-out as the spring extends.

With an arrangement of wishbones wherein the upper wishbone forms an auxiliary tie rod which is shorter than the auxiliary tie rod formed by the lower wishbone with the length of the wishbone being one-half the additional distance, a progressive change in camber is produced. The higher the instantaneous pole is set and/or the lower the lengthwise arm bearing is mounted, the earlier this can be accomplished.

The lengths of the auxiliary tie rods according to the invention are related to the vertical arrangement of the articulation of the lengthwise arm, vertical relative to the wheel axis, such that the toe-in curve can be tilted for a wheel with negative camber by providing that the articulation of the lengthwise arm to the vehicle body, when looking forward in the direction of travel, is located at a height above the wheel axle such that the instantaneous axis running through the articulation and the transverse pole drops less sharply toward the center of the vehicle than does the wheel axle. This measure means that the camber curve will be rotated in the direction of positive toe-in when the spring is compressed and in the direction of negative camber, or toe-out, when the spring is extended. In this way, an understeering camber characteristic is achieved in an axle with wheels suspended according to the invention.

According to a further feature of the invention, the articulations of the wishbones with the vehicle body, in the direction of travel, are disposed ahead of the transverse plane or the wheel axle, and a short vertical distance apart with the articulation of the lower wishbone being located approximately at the height of the wheel axle. This arrangement produces two structural advantages, namely, that the articulation of the upper wishbone to the vehicle can be located relatively low, offering the advantages of a low trunk floor, and of the articulation of the lower wishbone to the vehicle being locatable relatively high up, offering the advantage of a high exhaust pipe location.

Also, by providing the wishbone articulations vertically spaced, as referred to above, the advantage of a space-saving, simple, and lightweight introduction of directing forces into the vehicle body is attained.

The additional arrangement of the lengthwise arm on the vehicle body near the wheel profile permits large auxiliary tie-rod lengths as well as antidive and antisquat angles to be produced in an advantageous fashion.

These and further objects, features and advantages of the present invention will become more obvious from the following description when taken in connection with the accompanying drawings which show, for purposes of illustration only, a single embodiment in accordance with the present invention.

Figure 2:
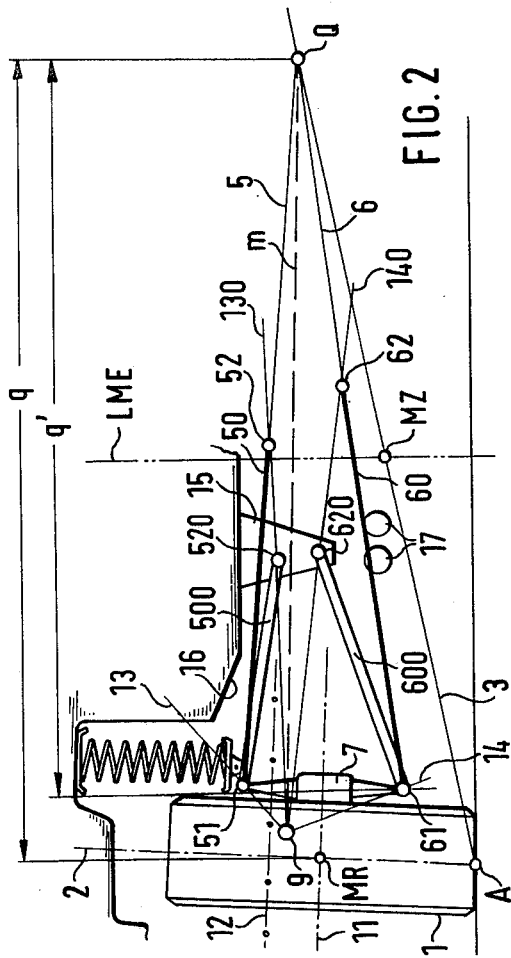
FIG. 2 shows a transverse projection thereof.
Figure 3:
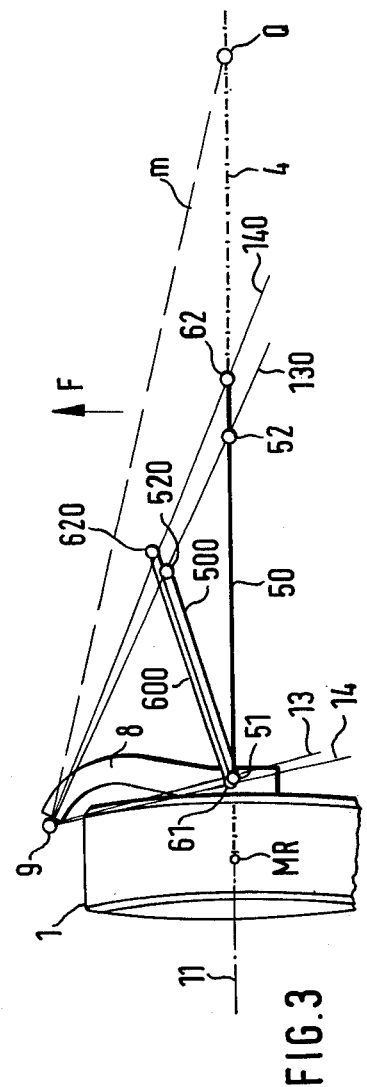
FIG. 3 shows a horizontal projection thereof.
Figure 1:
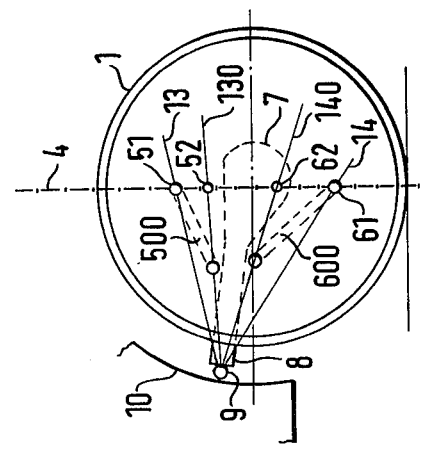
FIG. 1 shows a longitudinal projection of an individual wheel suspension according to the invention.

In the transverse projection, a wheel 1 with negative camber (not drawn to scale) is shown. A line 3, on whose extension through MZ transverse pole Q is located, runs from contact point A of wheel center plane 2 of wheel 1 through the center of momentum MZ plotted at a predetermined height through the vehicle's lengthwise central plane LME. The distance q of transverse pole Q from wheel center plane 2 in the middle of wheel MR is determined from the spring travel f measured on wheel 1, relatively large to provide comfortable springing, and a desirably small change in camber during spring deflection, according to equation $q = f/\Delta\gamma$.

Transverse pole Q lies in a transverse plane running vertically through the middle of wheel MR, the transverse plane being represented in the horizontal projection and longitudinal projection by a line 4. In the transverse projection, lines 5 and 6 run from Q approximately to the edge of a wheel rim of wheel 1, not shown. An auxiliary tie rod 50 forming part of an upper wishbone 500 is shown on the upper line 5 and an auxiliary tie rod 60 forming part of a lower wishbone 600 is shown on the lower line 6. Auxiliary tie rods 50 and 60 are located together with their articulations 51 and 61 to the wheel support near wheel 1 or wheel center plane 2 at an additional distance q' measured from transverse pole Q. The additional distance q' is determined between articulations 51 and 61. Auxiliary tie rod 50 has a length of q'/2 while auxiliary tie rod 60 is slightly longer than q'/2. The articulations 52 and 62 attach each respective auxiliary tie rod 50 and 60 to the vehicle body at positions which correspond to the length of the respective tie rods as determined from the relationships set forth above.

Wheel 1 is connected to a trailing arm 7 which is firmly attached to a lengthwise arm 8 disposed in the lengthwise direction of the vehicle. Lengthwise arm 8 is articulated by an articulation 9 to vehicle body 10, whereby articulation 9, looking in the direction of travel F, is disposed ahead of axle 11. To achieve a large antidive and antisquat angle, articulation 9 is also selected to be at a level above wheel axle 11, but no higher than on a parallel line 12 running through transverse pole Q to wheel axle 11 (looking in the transverse projection). Furthermore, articulation 9 is chosen to be near wheel center plane 2.

From articulation 9, lines 13 and 130 run to articulations 51 and 52 of upper auxiliary tie rod 50, located in transverse plane 4, and lines 14 and 140 run to articulations 61 and 62 of the lower auxiliary tie rod 60 which lie in transverse plane 4. Wishbones 500 and 600, including auxiliary tie rods 50 and 60, which require little space for installation, are relatively short and consequently easily installed, provide an articulation of trailing arm 7 with a pedestal 15 on vehicle floor 16 via articulations 520 and 620 and articulations 52 and 62. Articulations 520 and 620 are aligned with lines 130 and 140 in front of transverse plane 4, looking in the direction of travel (arrow F). Articulations 51 and 61 of auxiliary tie rods 50 and 60 in the example shown are identical to and ideally use the same articulations as the wishbones 500 and 600 on the supports for the wheels and are firmly attached to trailing arm 7. Articulations 520 and 620 associated with vehicle floor 16 are arranged with a relatively short vertical distance between them, whereby articulation 620 of lower wishbone 600 is located at approximately the level of axle 11. A relatively low vehicle floor 16 as well as a high exhaust pipe 17 are the result.

If the instantaneous axis m of the individual wheel suspension, running through articulation 9 and transverse pole Q, is less inclined with respect to the vehicle lengthwise central plane LME than axle 11, a favorable toe-in behavior results for wheel 1 with the desired small change in camber as a result of the predetermined spring travel produced by the parallel spring deflection.

Articulation 9 can also be made in the form of an elastic bearing with different spring hardnesses in different directions, in order to produce a desirable toe-in behavior for wheel 1 under the influence of longitudinal or lateral forces with the desired lengthwise springing of wheel 1. Advantageously, a bearing of this kind is achieved with articulation 9 located outside wheel center plane 2, whereby an elastokinematically favorable articulation of the individual wheel suspension is achieved.

One or both wishbones can be disposed behind transverse plane 4, whereby, however, a vehicle axle with wishbones which may possibly intersect is produced, thereby producing greater unsprung weights, without departing from the scope of the invention.

The invention also applies to a wheel with positive camber, whereby a favorably understeering toe-in behavior is produced when the instantaneous axis, in the case of a lengthwise arm articulation which is disposed below the axle, intersects at the vehicle with the axle, and in the case of a lengthwise arm articulation located above the axle, intersects outside the vehicle.

While we have shown and described a single embodiment in accordance with the present invention, it is understood that the same is not limited thereto, but is susceptible of numerous changes and modifications as known to those skilled in the art and we, therefore, do not wish to be limited to the details shown and described herein, but intend to cover all such changes and modifications as are encompassed by the scope of the appended claims.

We claim:

1. An individual wheel suspension for a non-steered wheel of a motor vehicle having a vehicle body and a wheel support wherein a change in camber of the wheel is exhibited during spring deflection, comprising a trailing arm which is rigidly connected to the wheel support and articulated to the vehicle body by means of a lengthwise arm disposed in the lengthwise direction of the vehicle and in a direction running transversely to the vehicle by means of two wishbones located one above the other, the wishbones form auxiliary tie rods in a transverse plane running vertically through the center of the wheel, extensions of said tie rods beyond the center of the vehicle intersect at a transverse pole located at a distance from the wheel center plane, said auxiliary tie rods include articulations to the wheel support which are provided at an additional distance determined relative to said transverse pole in the vicinity of the wheel center plane, the auxiliary tie rod of the lower wishbone is at least approximately half as long as said additional distance and the upper wishbone forms an auxiliary tie rod whose length is less than or equal to that of the auxiliary tie rod of the lower wishbone, said lengthwise arm is arranged pointed forward in the direction of travel of the vehicle with the articulation of the lengthwise arm to the vehicle body being located above the wheel axle and in the vicinity of the wheel center plane.

2. An individual wheel suspension according to claim 1, wherein the wishbones form auxiliary tie rods of equal length, arranged symmetrically with respect to the wheel axle, said wishbones having lengths corresponding to approximately half said additional distance whereby the articulation of the lengthwise arm to the vehicle body, looking from the rear, is disposed maximally at the level of a line parallel to the wheel axle and through the transverse pole.

3. An individual wheel suspension according to claim 1, wherein the wishbones form auxiliary tie rods each having a length greater than half the additional distance.

4. An individual wheel suspension according to claim 1, wherein the upper wishbone forms an auxiliary tie rod which is shorter than the auxiliary tie rod formed by the lower wishbone and the length of the auxiliary tie rod formed by the lower wishbone is half said additional distance.

5. An individual wheel suspension according to claim 1, 2, 3 or 4, wherein the wheel has a negative camber, and wherein the articulation of the lengthwise arm to the vehicle body, when looking forward in the direction of travel, is located at a height above the wheel axle such that the instantaneous axis running through the articulation and the transverse pole drops less sharply towards the center of the vehicle than does the wheel axle.

6. An individual wheel suspension according to claim 5, wherein both wishbones with their articulations associated with the vehicle body, in the direction of travel, are disposed ahead of the transverse plane of the wheel axle.

7. An individual wheel suspension according to claim 6, wherein the articulation of the wishbones on the vehicle body are disposed a relatively short vertical distance apart, the articulation of the lower wishbone on the vehicle body being located approximately at the height of the wheel axle.

8. An individual wheel suspension according to claim 5, wherein the articulation of the lengthwise arm on the vehicle body is located near the wheel profile on the vehicle body.

9. An individual wheel suspension according to claim 5, wherein the additional distance roughly corresponds to the transverse pole distance.

10. An individual wheel suspension according to claim 1, 2, 3 or 4, wherein both wishbones with their articulations associated with the vehicle body, in the direction of travel, are disposed ahead of the transverse plane or the wheel axle.

11. An individual wheel suspension according to claim 10, wherein the articulations of the wishbones on the vehicle body are disposed a relatively short vertical distance apart, the articulation of the lower wishbone on the vehicle body being located approximately at the height of the wheel axle.

12. An individual wheel suspension according to claim 1, 2, 3 or 4, wherein the articulation of the lengthwise arm on the vehicle body is located near the wheel profile on the vehicle body.

13. An individual wheel suspension according to claim 1, 2, 3 or 4, wherein the additional distance roughly corresponds to the transverse pole distance.

* * * * *